Dec. 1, 1942. C. H. NORDELL 2,303,950
CONDUIT BEND
Filed Jan. 13, 1940
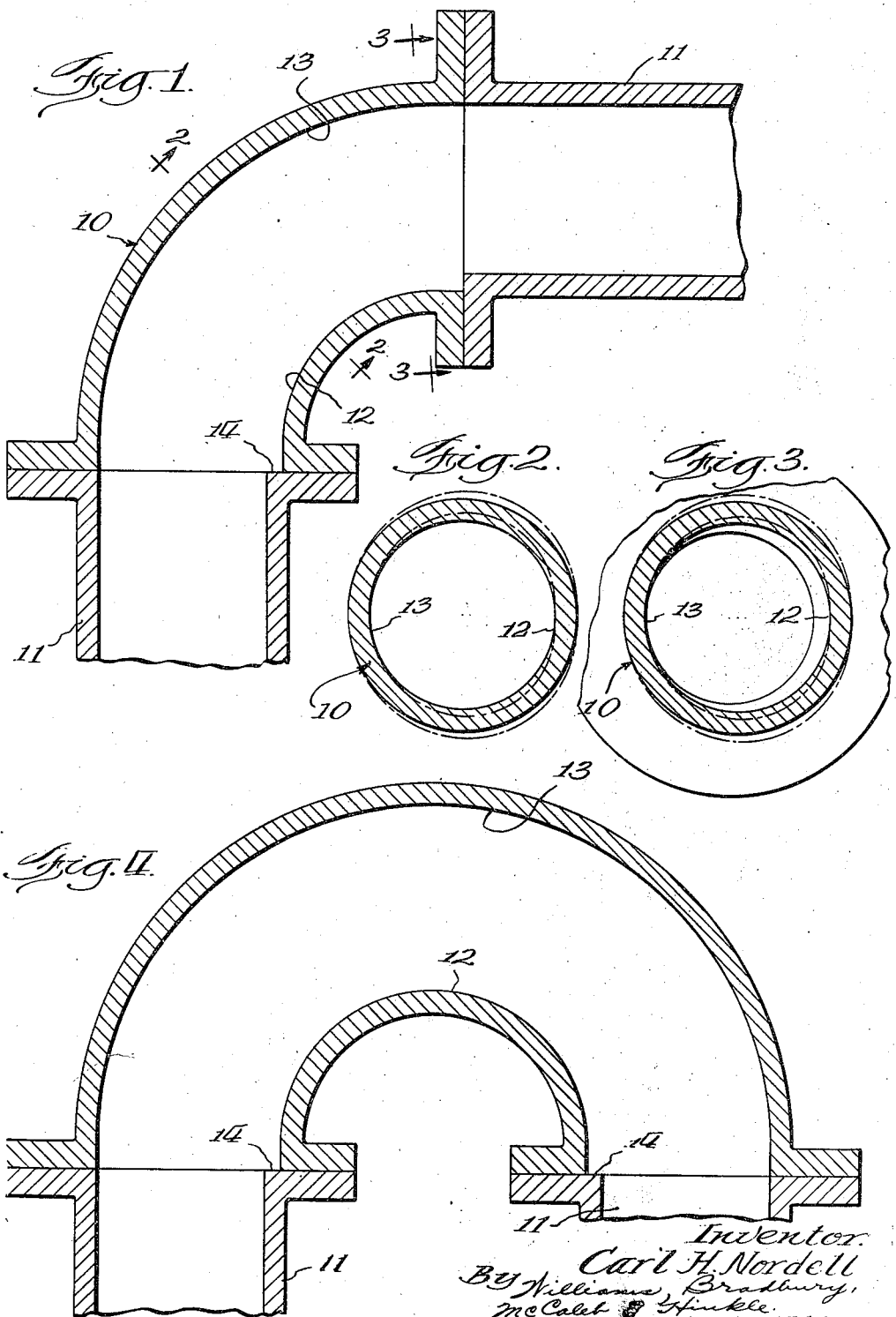

Patented Dec. 1, 1942

2,303,950

UNITED STATES PATENT OFFICE 2,303,950

CONDUIT BEND

Carl H. Nordell, Chicago, Ill.

Application January 13, 1940, Serial No. 313,662

1 Claim. (Cl. 138—39)

This invention relates to fluid conduit bends including pipe bends, and has for its principal object to provide bends in which the resistance to flow and erosion resulting therefrom are minimized to a great extent.

Other objects, advantages and capabilities of the invention will appear from the following description of preferred embodiments thereof, taken in conjunction with the accompanying drawing, in which:

Figure 1 is a sectional view through a 90° bend embodying my invention;

Fig. 2 is a cross sectional view taken on the line 2—2 of Fig. 1;

Fig. 3 is a cross sectional view taken on the line 3—3 of Fig. 1;

Fig. 4 is a sectional view of a U-bend of the type similar to the bend of Fig. 1.

Before referring specifically to the embodiments of the invention illustrated by the drawing, I would point out the general fact with relation to the bends of this invention, that they require for low resistance to flow, an enlargement which is between about 10% and about 30% of the cross sectional area of the conduits to which the bends are connected. If the inner walls of the bends are very smooth, the enlargement may be somewhat less than 10%, while if the bends are quite rough and particularly where the bends are of large diameter, the enlargement may somewhat exceed 30% of the straight conduit cross sectional area. Ordinarily, however, the enlargement should fall within the range between 10% and 30%. The manner in which this enlargement is provided will readily be understood from the following discussion of the specific embodiments of the invention illustrated in the drawing.

Referring to Figs. 1, 2 and 3 of the drawing, the reference numeral 10 indicates a 90° bend which is connected, for example, by terminal flanges to straight conduits 11. For convenience I refer to the main plane of the bend. The axis or center line of the bend, being in the form of an arc, defines a plane which I regard as the main plane of the bend. Fig. 1 is a sectional view taken in this plane. The intersection of this plane with the surface of the bend on the inner side thereof is referred to as the inner contour. The inner contour is indicated by the reference numeral 12. The outer contour which also lies in the main plane of the bend is indicated by the reference numeral 13.

The cross-sectional area of the bend 10 is substantially uniform throughout its length, this area being greater than the cross-sectional area of the connecting conduits 11 by an amount preferably lying within the range previously indicated. As shown in Fig. 2 in full lines, the cross-section of the bend is preferably of circular form. The outer contour 13 is arranged to be in substantial alignment with the openings of the conduits 11. The inner contour 12 is not in alignment with the openings of the connecting conduits 11. It is displaced inwardly to some extent providing a step formation 14.

If desired, the cross-sectional area may be further enlarged as indicated in dotted lines in Fig. 2 so as to provide the bend with a substantially elliptical cross-section. The elliptical formation is deformed so that the resulting increase in area of the cross-section of the bend is provided principally on the inner side of the bend.

If desired, the bend 10 may be provided with straight or tangential portions at the ends of its main arcuate portion. Ordinarily these straight portions should be between about the diameter of the conduit and one-quarter the diameter of the conduit.

The U-bend illustrated in Fig. 4 is substantially similar at its ends and throughout its cross-section to the 90° bend described in Figs. 1, 2 and 3. This U-bend extends through 180° instead of 90° as it is the case with the first-described embodiment.

Although the invention has been described in connection with the details of specific embodiments thereof, it must be understood that such details are not intended to be limitative of the invention except as set forth in the accompanying claim.

Having thus described my invention, what I claim is new and desire to secure by Letters Patent of the United States is:

In a conduit arrangement for the transmission of hydraulic fluid under pressure with low flow resistance losses, the combination of a fluid conduit bend which is symmetrical about a transverse plane passing through its apex, which has a substantially uniform cross-sectional area, and in which the radius of curvature is less than twice the diameter, a pair of conduits connected to the ends of said bend, said conduits having cross-sectional areas which are from 77% to 91% of the cross-sectional area of said bend, each of said conduits providing an internal step formation with the interior of the bend and being substantially tangent to the outer contour of said bend.

CARL H. NORDELL.